(12) United States Patent
Gruber et al.

(10) Patent No.: US 12,485,847 B2
(45) Date of Patent: Dec. 2, 2025

(54) SEAT BELT BUCKLE UNIT

(71) Applicant: Bayerische Motoren Werke Aktiengesellschaft, Munich (DE)

(72) Inventors: Christian Gruber, Anzing (DE); Michael Leng, Geltendorf (DE); Philip Leng, Sielenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 256 days.

(21) Appl. No.: 18/546,211

(22) PCT Filed: Feb. 4, 2022

(86) PCT No.: PCT/EP2022/052654
§ 371 (c)(1),
(2) Date: Aug. 11, 2023

(87) PCT Pub. No.: WO2022/171527
PCT Pub. Date: Aug. 18, 2022

(65) Prior Publication Data
US 2024/0116473 A1    Apr. 11, 2024

(30) Foreign Application Priority Data
Feb. 12, 2021   (DE) .................. 10 2021 103 334.9

(51) Int. Cl.
*B60R 22/32*    (2006.01)
(52) U.S. Cl.
CPC .................. *B60R 22/324* (2013.01)
(58) Field of Classification Search
CPC ....... B60R 22/324; B60R 22/28; B60R 22/19; B60R 22/195; B60R 22/35; B60R 22/36; B60R 22/405; B60R 2022/288
(Continued)

(56) References Cited

U.S. PATENT DOCUMENTS 3,286,946 A * 11/1966 Board .................. B60R 22/35
                                                                 242/381.1
4,197,619 A    4/1980 Burleigh
(Continued)

FOREIGN PATENT DOCUMENTS

DE         28 19 018 A1    10/1979
JP         2017177948    *  3/2016

OTHER PUBLICATIONS

PCT/EP2022/052654, International Search Report dated May 10, 2022 (Two (2) pages).
(Continued)

*Primary Examiner* — Jose V Chen
(74) *Attorney, Agent, or Firm* — Crowell & Moring LLP

(57) ABSTRACT

A safety belt lock unit includes a belt lock and a belt lock tongue which is connected to a safety belt. The belt lock has a locking arrangement with a locking mechanism which brings about a positive-locking engagement with the belt lock tongue. The belt lock has an unlocking mechanism where the locking mechanism can be brought out of engagement with the belt lock tongue by applying an unlocking force. A pressure-relief mechanism is disposed between the belt lock tongue and the belt lock. The pressure-relief mechanism moves the belt lock tongue into the belt lock when the belt lock tongue tilts in the belt lock which occurs in a vehicle collision by a tensioning triggered by a belt tensioning device of the safety belt and/or takes up some of a tensile force which is brought about by the belt tensioning device.

7 Claims, 1 Drawing Sheet

(58) Field of Classification Search
USPC .................................. 297/468, 470, 479, 480
See application file for complete search history.

(56) References Cited

U.S. PATENT DOCUMENTS

| | | | | |
|---|---|---|---|---|
| 4,253,702 A | | 3/1981 | Lehr | |
| 4,375,714 A | * | 3/1983 | Korger | A44B 11/2523 |
| | | | | 24/640 |
| 5,634,690 A | * | 6/1997 | Watanabe | B60R 22/1952 |
| | | | | 297/480 |
| 5,788,025 A | * | 8/1998 | Nishide | B60R 22/1952 |
| | | | | 74/577 M |
| 6,419,272 B1 | * | 7/2002 | Yamaguchi | F16D 41/12 |
| | | | | 297/480 |
| 6,575,498 B2 | * | 6/2003 | Nagata | B60R 22/4633 |
| | | | | 297/480 |
| 6,659,548 B2 | * | 12/2003 | Becker | B60R 22/26 |
| | | | | 297/479 |
| 7,758,074 B2 | * | 7/2010 | Takamatsu | B60R 22/4633 |
| | | | | 297/480 |
| 2006/0243843 A1 | * | 11/2006 | Clute | B60R 22/4676 |
| | | | | 242/374 |
| 2007/0241550 A1 | * | 10/2007 | Bieg | B60R 22/4628 |
| | | | | 297/480 |
| 2011/0068614 A1 | * | 3/2011 | Sugiyama | B60R 22/1955 |
| | | | | 297/480 |
| 2016/0166013 A1 | * | 6/2016 | Szewczyk | A44B 11/125 |
| | | | | 24/69 SB |
| 2017/0197580 A1 | * | 7/2017 | Lee | B60R 22/4633 |
| 2019/0071052 A1 | * | 3/2019 | Woellert | B60N 2/28 |
| 2020/0164833 A1 | * | 5/2020 | Owaki | B60R 22/405 |

OTHER PUBLICATIONS

German Search Report issued in German application No. 10 2021 103 334.9 dated Nov. 4, 2021, with Statement of Relevancy (Six (6) pages).

* cited by examiner

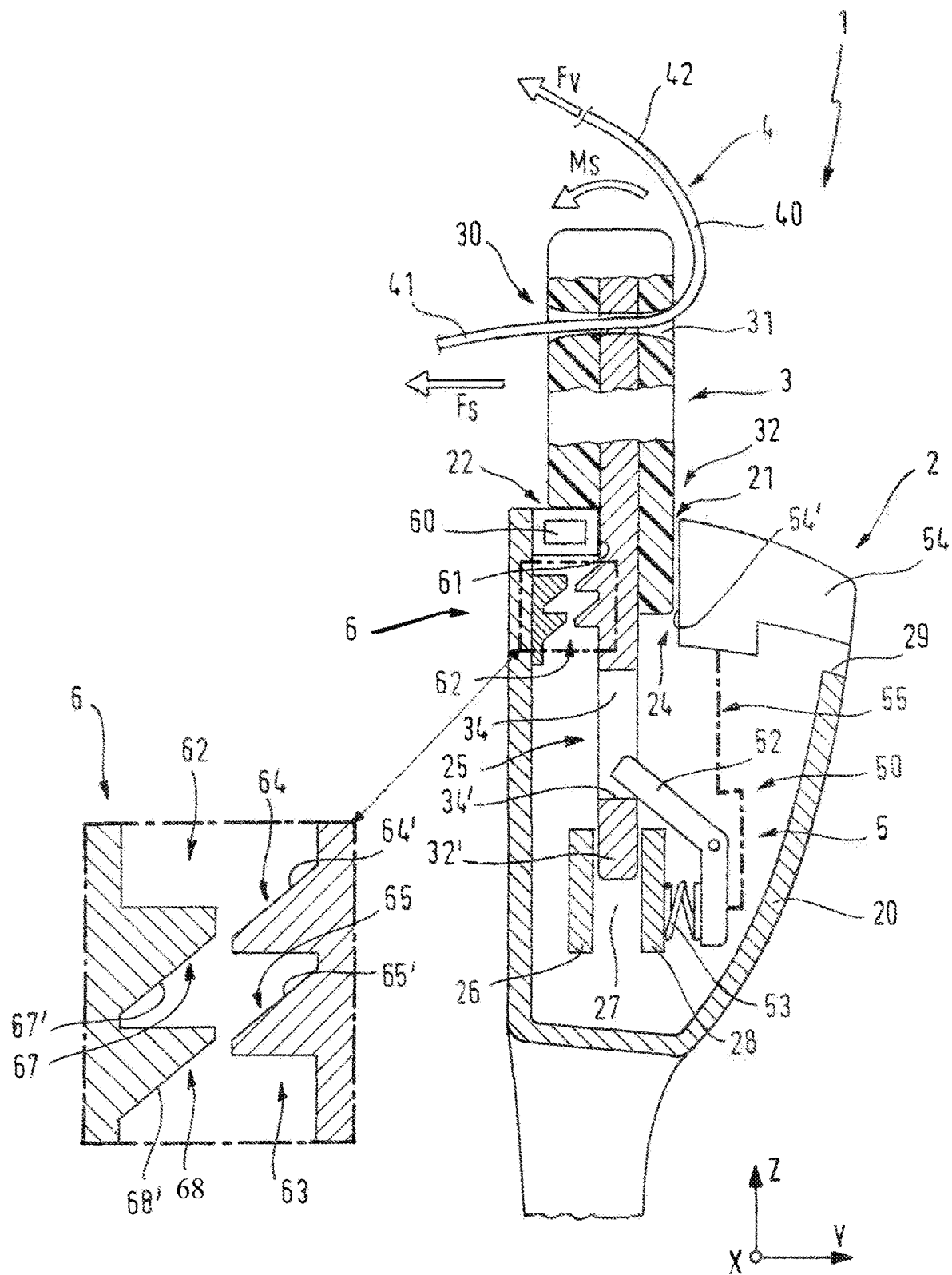

SEAT BELT BUCKLE UNIT

BACKGROUND AND SUMMARY OF THE INVENTION

The invention relates to a safety belt lock unit. It further relates to a vehicle, in particular a motor vehicle, having at least one safety belt arrangement which has such a safety belt lock unit.

Safety belt arrangements in vehicles, in particular in motor vehicles, are nowadays provided with a belt tensioning device which tensions the safety belt abruptly in the event of a vehicle collision and which is tightly applied to the body of a passenger who is secured on a vehicle seat with the safety belt. The body is thereby connected to the vehicle seat without play as far as possible so that the means provided in the vehicle for discharging kinetic energy can brake the kinetic energy of the body of the passenger in an optimum manner. The taut connection of the body to the vehicle seat can further ensure that safety devices which are provided in or on the vehicle seat, such as, for example, side airbags, can optimally protect the passenger.

In the event of a side collision, in which the body of the passenger does not stretch the pretensioned safety belt as a result of the mass inertia thereof, the pretensioning force, which acts from the belt tensioning device on the safety belt and therefore also on the safety belt lock unit, of the safety belt is also maintained after the vehicle collision has occurred. The increased tensile force which thereby acts on the safety belt and which is caused by the belt tensioning device and which is introduced from the belt lock tongue via the locking means into the belt lock brings about an increased release force of the locking means out of the engagement thereof with the belt lock tongue, which results in an increased unlocking force.

An object of the present invention is to provide an improved safety belt lock unit which also allows easy opening of the belt lock after the activation of a belt tensioning member has been carried out.

A safety belt lock unit comprising a belt lock and a belt lock tongue which is connected to a safety belt, wherein the belt lock has a locking arrangement with locking means which bring about a positive-locking engagement with the belt lock tongue in the closed state of the safety belt lock unit and which retain it in the belt lock so that a tensile force which acts on the safety belt is introduced from the belt lock tongue via the locking means into the belt lock, and wherein the belt lock has unlocking means, with which the locking means can be brought out of engagement with the belt lock tongue by applying an unlocking force in order to bring about an open state of the safety belt lock unit, in which the belt lock tongue can be pulled out of the belt lock again, is characterized according to the invention in that there is provided between the belt lock tongue and the belt lock a pressure-relief mechanism which moves the belt lock tongue slightly into the belt lock when the belt lock tongue tilts in the belt lock, which occurs in the event of a vehicle collision as a result of an abrupt tensioning, which is triggered by a belt tensioning device, of the safety belt, and/or takes up some of the tensile forces and thereby reduces the pressure on the force transmission between the belt lock tongue and the locking means.

The tilting of the belt lock tongue is carried out here by a force which acts thereon transversely relative to the surface extent of the belt lock tongue and which brings about a tilting torque which tilts the belt lock tongue about a restraint of the free end, which engages in the belt lock, of the belt lock tongue. In this case, the tilting axis extends in the plane of the surface extent of the belt lock tongue.

In the state after a collision and a belt tensioning action which is thereby caused and which is carried out by a belt tensioning device, that is to say, when no tensile forces which are currently brought about by collision forces in the safety belt lock unit act any longer between the belt lock tongue and the locking means, the pressure relief mechanism which is provided according to the invention takes up some of the tensile forces which are brought about by the belt tensioning device and thus relieves the pressure on the connection of the locking means with respect to the belt lock tongue, whereby the unlocking force is reduced.

The abrupt tensioning, which is triggered in the event of a vehicle collision by a belt tensioning device, of the safety belt causes the safety belt to be applied tightly to the body of a passenger who is secured with the safety belt. The tensile stress which is thereby brought about in the safety belt is also maintained after the collision. The belt lock is supported, for example, on the vehicle seat so that the belt lock tongue is tilted in the belt lock by the direction vector of the tensile force, which acts thereon, of the safety belt. The pressure relief mechanism provided between the belt lock tongue and the belt lock uses this tilting movement in order thereby to take up some of the tensile forces and/or to move the belt lock tongue slightly counter to the tensile force action into the belt lock, whereby the pressure on the force transmission between the belt lock tongue and the locking means is relieved and the push-button with the unlocking means can be actuated more easily.

The invention is particularly advantageous in the event of a side collision because in this instance the expansion of the pretensioned safety belt band by the mass inertia of the passenger is smaller and consequently the pretensioning force, which acts on the safety belt by means of the belt tensioning device and therefore also on the safety belt lock unit, of the safety belt is also maintained after a vehicle collision has occurred.

It is particularly advantageous for the pressure relief mechanism to have a ramp face arrangement, which is active between the belt lock tongue and the belt lock, with at least one ramp and at least one guide element which cooperates with the at least one ramp. As a result of such a ramp face arrangement, in which the at least one guide element slides or rolls on a ramp face of the at least one ramp, a longitudinal force which acts on the belt lock tongue in the direction into the belt lock can be applied in a simple and reliable mechanical manner by a sideways movement, which occurs in the event of the belt lock tongue tilting, of the belt lock tongue.

In this case, it is advantageous for the ramp face arrangement to have a first row of teeth which is provided on the belt lock tongue and which has at least one ramp and a second row of teeth which is located on the belt lock housing and which has at least one counter-ramp which forms the guide element, and for the ramp face of the ramp which is located on the belt lock tongue to be constructed in order to move into engagement with the ramp face of the counter-ramp and to slide along it.

It is also advantageous for a deformation element to be provided between the belt lock tongue and the belt lock and to be constructed in order to be plastically or resiliently deformed in the event of the belt lock tongue tilting in the belt lock. Such a deformation element forms in the normal case, that is to say, in a non-activated belt tensioning device, a precise guide of the belt lock tongue for introducing the belt lock tongue into the belt lock.

In this case, it is advantageous for the deformation element to be arranged and constructed so that the pressure relief mechanism is active only in the event of a deformation of the deformation element. It is thereby ensured that the pressure relief mechanism comes into force only when the belt tensioning device has been activated and the belt lock tongue has thereby been tilted. If the belt lock tongue is not tilted because, for example, the body of the passenger is retained by the safety belt in the case of a front-end collision and the safety belt thereby applies a tensile force with a different tensile force vector to the belt lock tongue, the collision-related tensile force is supported exclusively via the locking action between the belt lock tongue and the locking device.

The invention is further directed toward a vehicle, in particular a motor vehicle, having at least one safety belt arrangement which has such a safety belt lock unit according to the invention.

Preferred embodiments of the invention with additional configuration details and additional advantages are described and explained in greater detail below with reference to the appended drawing.

BRIEF DESCRIPTION OF THE DRAWING

The FIGURE shows a longitudinal section through a safety belt lock unit according to the invention in the locked state.

DETAILED DESCRIPTION OF THE DRAWING

The FIGURE shows a safety belt lock unit 1 in the closed state with a belt lock 2 and a belt lock tongue 3 which is introduced therein and which is connected to a safety belt 4 at the upper end thereof which projects out of the belt lock 2.

In the example shown, the safety belt 4 is a three-point safety belt with a belt band 40 which forms a lap belt portion 41 and a shoulder belt portion 42 in a manner generally known. The belt band 40 is guided through a guide slot 31 which is provided in a belt redirecting portion 30 which is constructed at the upper end of the belt lock tongue 3.

A tongue portion 32 of the belt lock tongue 3 extends away from the belt redirecting portion 30, which tongue portion 32 has in the lower portion thereof a through-opening 34 which forms a receiving member for a bar 52, which forms locking means 50, of a locking arrangement 5. The locking arrangement 5 is provided in the belt lock 2 which has a belt lock housing 20 which is provided at the upper side thereof with an introduction slot 21 for the tongue portion 32 of the belt lock tongue 3. There are formed inside the belt lock housing 20 upper guide members 22, 24 which between them form the introduction slot 21 as an upper guide slot for the tongue portion 32 and has lower guide members 26, 28 which between them form a lower guide slot 27, in which the lower end 32' of the tongue portion 32 is received in the locked state shown. There is provided between the upper guide members 22, 24 and the lower guide members 26, 28 a free locking region 25, in which the locking means 50 can move so that the bar 52 can engage in the through-opening 34 of the tongue portion 32. At the upper end of the belt lock housing 20 a recess 29 for a push-button 54 of the locking arrangement 5 is provided. The bar 52 which engages in the through-opening 34 of the tongue portion 32, which is introduced into the guide slots 23, 27, in a state pretensioned by a spring 53, and which is retained therein by the spring 53 is connected to the push-button 54 via an actuation mechanism which is not illustrated but which is represented by a dot-dash line which indicates an unlocking means 55 so that an actuation of the push-button 54 moves the bar 52 counter to the force of the spring 53 out of the through-opening 34 of the tongue portion 32 and releases it, that is to say, cancels the locking action.

In the example shown, the upper guide members 22, 24 are formed by a side wall 54' of the push-button 54 and by a side wall 61, which is located opposite this side wall 54', of a deformation element 60 which is arranged in the belt lock housing 20 at a side of the introduction slot 21. The deformation element 60 is part of a pressure relief mechanism 6, which is described below, of the safety belt lock unit 1. Naturally, the deformation element 60 can alternatively be fitted to the belt lock tongue 3, wherein the introduction slot 21 is then delimited by the inner housing edge of the belt lock housing 20 at the side opposite the push-button 54.

The pressure relief mechanism 6 further has a ramp face arrangement 62 which is provided between the belt lock tongue 3 and the belt lock 2 and which in the example shown has a row of teeth 63 which is formed on the tongue portion 32 and which has ramps 64, 65 which are arranged one above the other and the ramp faces 64', 65' of which extend obliquely downward away from the tongue portion 32. At the side of the belt lock housing 20, an additional row of teeth is arranged with ramps 67, 68 arranged one above the other and the ramp faces 67', 68' of which extend obliquely upward toward the tongue portion 32 and form guide elements as counter-ramps which cooperate with the ramp faces 64', 65' of the ramps 64, 65 on the tongue portion 32 in a manner described below.

If the belt band 40 of the safety belt 4 is tensioned with a pretensioning force $F_V$ by a belt tensioning device (not shown), a transverse force $F_S$ which causes a torque $M_S$ about the restraint of the tongue portion 32 between the lower guide members 26, 28 acts on the belt redirecting portion 30 of the belt lock tongue 3 and therefore brings about a tilting of the belt lock tongue 3 counter to the deformation force of the deformation element 60. The deformation element 60 is compressed in a transverse direction Y in this case and becomes deformed. As a result of the transverse force $F_S$ which acts transversely relative to the surface extent of the belt lock tongue 3 thereon and the tilting torque Ms which is brought about thereby, the belt lock tongue 3 is consequently tilted about a tilting axis which is formed in the region of the restraint of the tongue portion 32 between the lower guide members 26, 28 therebetween and which extends in the plane of the surface extent of the tongue portion 32 of the belt lock tongue 3 and consequently transversely relative to the through-opening 34.

During this tilting action, the ramp faces 64', 65', which are otherwise spaced apart from each other, of the ramps 64, 65 on the tongue portion 32 of the belt lock tongue 3 move into engagement with the ramp faces 67', 68' of the ramps 67, 68 in the belt lock housing 20, wherein the ramp faces 64', 67' and 65', 68' slide along against each other and in this case draw the belt lock tongue 3 slightly deeper into the belt lock housing 20 (downward in FIG. 1). In this case, some of the pretensioning force $F_V$ which is applied by the belt tensioning device is introduced via the ramp faces 64', 65', 67', 68' from the belt lock tongue 3 into the belt lock housing 20 and therefore into the belt lock 2 so that the pressure on the positive-locking engagement of the bar 52 with the lower edge 34' of the through-opening 34 is relieved. The locking arrangement 5 can thereby be released more easily.

The invention is not limited to the above embodiment which merely serves to generally explain the core notion of the invention. In the context of the protective scope, the apparatus according to the invention can instead also take on embodiments other than those described above. In this instance, the apparatus can particularly have features which constitute a combination of the respective individual features of the claims.

Reference characters in the description and drawing serve merely to provide a better understanding of the invention and are not intended to limit the protective scope.

LIST OF REFERENCE CHARACTERS

1 Safety belt lock unit
2 Belt lock
3 Belt lock tongue
4 Safety belt
5 Locking arrangement
6 Pressure relief mechanism
20 Belt lock housing
21 Introduction slot
22 Upper guide member
24 Upper guide member
26 Lower guide member
27 Lower guide slot
28 Lower guide member
29 Recess
30 Belt redirecting portion
31 Guide slot
32 Tongue portion
32' Lower end of 32
34 Through-opening
34' Lower edge of through-opening
40 Belt band
41 Lap belt portion
42 Shoulder belt portion
50 Locking means
52 Bar
53 Spring
54 Push-button
54' Side wall
55 Unlocking means
60 Deformation element
61 Side wall
62 Ramp face arrangement
63 Row of teeth
64 Ramp
64' Ramp face
65 Ramp
65' Ramp face
67 Ramp
67' Ramp face
68 Ramp
68' Ramp face
$F_S$ Transverse force
$F_V$ Pretensioning force
MS Torque
Y Transverse direction

The invention claimed is:

1. A safety belt lock unit, comprising:
    a belt lock;
    a belt lock tongue which is connected to a safety belt;
    wherein the belt lock has a locking arrangement with a locking means which brings about a positive-locking engagement with the belt lock tongue in a closed state of the safety belt lock unit and which retains the belt lock tongue in the belt lock such that a tensile force which acts on the safety belt is introduced from the belt lock tongue via the locking means into the belt lock;
    wherein the belt lock has an unlocking means and wherein the locking means can be brought out of engagement with the belt lock tongue with the unlocking means by applying an unlocking force in order to bring about an open state of the safety belt lock unit in which the belt lock tongue can be pulled out of the belt lock; and
    a pressure-relief mechanism disposed between the belt lock tongue and the belt lock, wherein the pressure-relief mechanism moves the belt lock tongue into the belt lock when the belt lock tongue tilts in the belt lock which occurs in an event of a vehicle collision as a result of a tensioning which is triggered by a belt tensioning device of the safety belt, and/or takes up some of a tensile force which is brought about by the belt tensioning device and thereby reduces a pressure on a force transmission between the belt lock tongue and the locking means.

2. The safety belt lock unit according to claim 1, wherein the pressure relief mechanism has a ramp face arrangement, which is disposed between the belt lock tongue and the belt lock, with at least one ramp and at least one guide element which cooperates with the at least one ramp.

3. The safety belt lock unit according to claim 1, wherein the pressure relief mechanism has a ramp face arrangement, wherein the ramp face arrangement has a first row of teeth which is provided on the belt lock tongue, wherein the first row of teeth has at least one ramp, wherein the ramp face arrangement has a second row of teeth which is provided on a belt lock housing, wherein the second row of teeth has at least one counter-ramp, and wherein a respective ramp face of the at least one ramp is configured to move into engagement with a respective ramp face of the at least one counter-ramp and to slide along the respective ramp face of the at least one counter-ramp.

4. The safety belt lock unit according to claim 1, further comprising a deformation element disposed between the belt lock tongue and the belt lock, wherein the deformation element is plastically or resiliently deformed when the belt lock tongue is tilted in the belt lock.

5. The safety belt lock unit according to claim 4, wherein the pressure relief mechanism is active only in an event of a deformation of the deformation element.

6. A vehicle, comprising:
    a safety belt arrangement which has the safety belt lock unit according to claim 1.

7. The vehicle according to claim 6, wherein the vehicle is a motor vehicle.

* * * * *